(12) United States Patent
Salle et al.

(10) Patent No.: US 8,595,168 B2
(45) Date of Patent: Nov. 26, 2013

(54) INSTANTIATING AN INFORMATION TECHNOLOGY SERVICE IN LIGHT OF MAINTENANCE REQUIREMENTS

(75) Inventors: Mathias Salle, San Francisco, CA (US); Erik L. Eidt, Campbell, CA (US); Yassine Faihe, Champagnier (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 258 days.

(21) Appl. No.: 13/258,710

(22) PCT Filed: Jul. 28, 2009

(86) PCT No.: PCT/US2009/051900
§ 371 (c)(1),
(2), (4) Date: Sep. 22, 2011

(87) PCT Pub. No.: WO2011/014159
PCT Pub. Date: Feb. 3, 2011

(65) Prior Publication Data
US 2012/0016830 A1    Jan. 19, 2012

(51) Int. Cl.
*G06F 17/00* (2006.01)
*G06N 5/02* (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| | | | |
|---|---|---|---|
| 7,548,969 B2 * | 6/2009 | Tripp et al. | 709/223 |
| 7,580,906 B2 * | 8/2009 | Faihe | 706/14 |
| 7,827,161 B2 * | 11/2010 | Faihe | 707/706 |
| 7,926,031 B2 * | 4/2011 | Faihe et al. | 717/121 |
| 8,252,407 B2 * | 8/2012 | Hannington | 428/166 |
| 8,255,903 B2 * | 8/2012 | Williams et al. | 717/174 |
| 8,339,988 B2 * | 12/2012 | Taylor et al. | 370/254 |
| 8,392,566 B1 * | 3/2013 | Salle et al. | 709/226 |
| 2002/0083097 A1 | 6/2002 | Warrington | |
| 2007/0022403 A1 | 1/2007 | Brandt et al. | |
| 2007/0234291 A1 | 10/2007 | Ronen et al. | |

OTHER PUBLICATIONS

International Search Report and Written Opinion received in PCT Application No. PCT/US2009/051900, dated Mar. 30, 2010, 11 pages.

* cited by examiner

*Primary Examiner* — Michael B Holmes (57) ABSTRACT

In a method of instantiating an information technology (IT) service in light of maintenance requirements, maintenance window instances are determined. The maintenance instance windows are associated with reusable service instances available in a datacenter. The maintenance window instances are analyzed in conjunction with a service model of said IT service to determine a maintenance efficient binding of a selection of said reusable service instances with which to provide an instance of said IT service.

15 Claims, 6 Drawing Sheets

DETERMINE MAINTENANCE WINDOW INSTANCES ASSOCIATED WITH REUSABLE SERVICE INSTANCES AVAILABLE IN A DATACENTER.
510

↓

ANALYZE THE MAINTENANCE WINDOW INSTANCES IN CONJUNCTION WITH A SERVICE MODEL OF THE INFORMATION TECHNOLOGY SERVICE TO DETERMINE A MAINTENANCE EFFICIENT BINDING OF A SELECTION OF THE REUSABLE SERVICE INSTANCES WITH WHICH TO PROVIDE AN INSTANCE OF THE INFORMATION TECHNOLOGY SERVICE.
520

↓

GROUND THE MAINTENANCE EFFICIENT BINDING IN THE DATACENTER.
530

INSTANTIATING AN INFORMATION TECHNOLOGY SERVICE IN LIGHT OF MAINTENANCE REQUIREMENTS

BACKGROUND

Presently, customers for information technology (IT) services are able to order many IT services that are remotely implemented and provided by datacenters. These datacenters may be located far away from the customer. Such remotely provided IT services can be economical and convenient for the IT customer as a wide variety of IT services including services such as databases, web servers, Internet protocol trackers, online storage and more are provided remotely in exchange for a fee. This relieves the customer of buying actual equipment and software to assemble such IT services. This also relieves the customer of needing to provide space, electricity, and climate control that are required for locally implemented IT services. This can also reduce the workload on the customer as the most or all software and hardware maintenance for these remotely provided IT services is provided by personnel employed by the datacenter or some other remote entity, and not by a local staff of the customer.

BRIEF DESCRIPTION OF THE DRAWINGS

The accompanying drawings, which are incorporated in and form a part of this specification, illustrate various embodiments of the present invention and, together with the description of embodiments, serve to explain principles discussed below.

The drawings referred to in this brief description of the drawings should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "accessing," "determining", "analyzing," "grounding," "providing," "defining," "performing," "receiving," or the like, often refer to the actions and processes of an electronic computing device or system, such as a datacenter or datacenter management system, among others. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

Maintenance windows (often referred to herein as maintenance window instances) are time intervals during which changes to an Information Technology (IT) service result in minimal business impact. Maintenance windows are typically scheduled events. During a maintenance window, a set of operations can be triggered corresponding to planned activities. Some non-limiting examples of operations are: weekly reboot of servers, installation of operating system and application patches, and installation of network updates, software and hardware upgrades, among others. Such activities can be triggered manually, such as by administrators, but are often triggered automatically by closed loop management systems. In contrast, urgent or emergency activities can occur outside of pre-defined/scheduled maintenance windows.

An information technology (IT) service is typically composed of a plurality of sub-services that operate or reside in a datacenter. In a datacenter that provides IT services for clients, it is often desirable to create a new instance of an IT service from existing subservices called IT artifacts (e.g., operating IT services, and subcomponents thereof, which have spare capacity) that are already deployed in the datacenter. This is accomplished by using the existing IT artifacts as building blocks with which to create all or part of the new IT service. Such reuse of existing IT artifacts tends to limit the number of servers in use and promote datacenter efficiency by reducing electrical costs for operating the servers and the cooling costs for the building in which the servers of the datacenter are housed. Additionally, efficient use of servers means more services can be provided by using a smaller amount of hardware, thus potentially saving in hardware cost, maintenance, and floor space requirements. Herein, existing IT artifacts, and subcomponents thereof, which have spare reusable capacity are often referred to as "reusable service instances."

Typically, each reusable service component has an associated maintenance window. Additionally, a client may request an IT service that has a particular maintenance window. Conventionally, however, the instantiation or assembly of an IT service in a datacenter has not taken maintenance windows into account. This can lead to issues when there is little or no association between the IT service and the assorted maintenance windows of the subcomponent service instances that constitute the IT service. Among other issues, this can result in IT services that have large maintenance windows (long time periods) and/or frequent instances of maintenance windows rather than IT services with short, consolidated maintenance windows.

Herein methods, systems, and techniques are described to dynamically an automatically instantiate IT services within a datacenter by reusing IT artifacts within the datacenter (when possible) while taking into account and consideration the maintenance windows that are associated with the IT artifacts. In such manner, IT services can be instantiated on a basis that will ensure that maintenance windows of subcomponents overlap or are closely spaced in time such that an overall maintenance window of the IT services is typically shorter and more consolidated that it would be if no consideration had been given to the maintenance windows and/or fits within a maintenance window that has been specified or defined in conjunction with the request of an IT service.

Discussion will begin with a description of a block diagram showing an example datacenter management system and an example datacenter. Aspects and components of the datacenter and the datacenter management system will be described. A second, slightly expanded, example datacenter and datacenter management system will be described in conjunction with description of grounding an IT service instance in the datacenter. Operation of the datacenter management system and the datacenter will be further described in conjunction with discussion of two example methods of instantiating an IT service in light of maintenance requirements. Finally, discussion will move to description of an example computer system with which or upon which various embodiments of the present invention can be implemented.

Example Datacenter Management System and Datacenter

Figure 1:
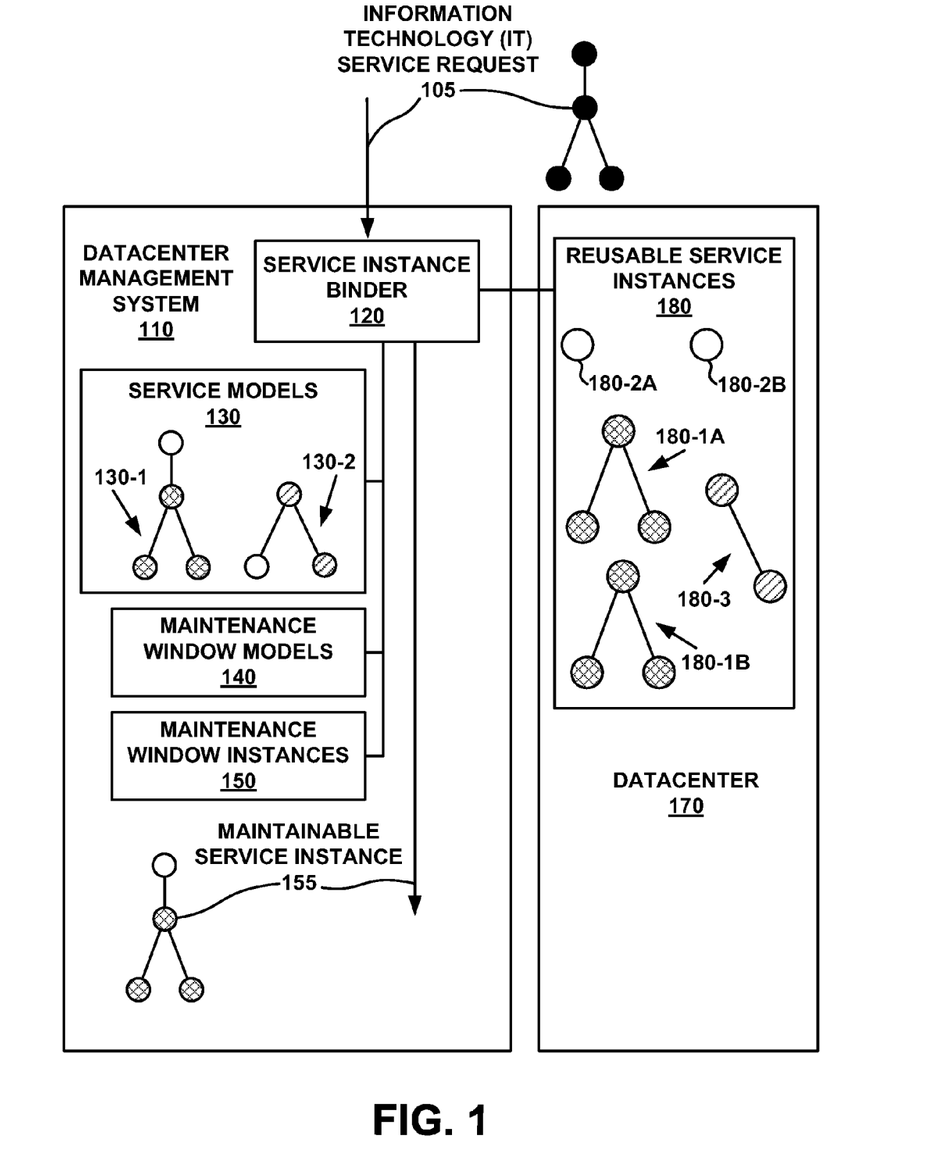
FIG. 1 is an example block diagram showing a datacenter management system and a datacenter, in accordance with an embodiment.

FIG. 1 is an example block diagram showing a datacenter management system 110 and a datacenter 170, in accordance with an embodiment. It is appreciated that other configurations are possible and that in one embodiment, datacenter management system 110 may be implemented in whole or in part in datacenter 170.

With reference to FIG. 1, datacenter 170 comprises a one or more servers running or capable of running software such as operating systems, databases, web servers and the like on demand for a (typically) remote client in exchange for a fee. Typically the hardware and software in datacenter 170 is maintained by one or more entities which sell the use or fractional use of the datacenter's hardware, software, or both. As but one non-limiting example, in one embodiment, datacenter 170 comprises a room or building full of equipment racks where a plurality of the racks are filled with server "blades," memory, storage, and the like can be configured with software to create IT services for use by clients.

As previously discussed, existing IT services running on servers in a datacenter can be referred to as IT artifacts. In many instances, all or portions of these IT artifacts have spare capacity due to their capabilities not being fully utilized by a client or combination of clients. Such spare capacity is referred to herein as a reusable service instance 180. For purposes of example, and not of limitation, several reusable service instances 180 (180-1A, 180-1B, 180-2A, 180-2B, and 180-3) are illustrated in FIG. 1. It is appreciated that reusable service instances 180 of FIG. 1 are shown by way of example and not of limitation, and that in other embodiments, a greater or lesser number of reusable service instances 180 may be present in a datacenter. As will be described more fully herein, these reusable service instances 180 comprise existing hardware and/or hardware/software running within datacenter 170. These reusable services instances 180 are also components that can be used as or assembled into other IT services for one or more clients. Reuse of a reusable service instance 180 as, or as a portion of, a newly created IT service precludes the need for creating a new instance of service instance that particular reusable service instance 180 represents. Thus, reuse of a reusable service instance 180 conserves space, time, and energy with respect to the operation of datacenter 170 by more fully utilizing underutilized existing components of datacenter 170.

With continued reference to FIG. 1, in one embodiment, datacenter management system 110 comprises a service instance binder 120, service models 130, maintenance window models 140, and maintenance window instances 150, all of which are communicatively coupled, such as by a bus or other communicative coupling(s), such that information can be exchanged as required in the operation of datacenter 170.

Service instance binder 120, as shown in the embodiment of FIG. 1, is communicatively coupled with service models 130, maintenance window models 140, and maintenance window instances 150. Service instance binder 120 is also communicatively coupled with reusable service instances 180 in datacenter 170 such that service instance binder 120 is aware of a selection of reusable service instances 180 that are available, at any particular time, for reuse. Service instance binder 120 accesses and/or receives information from one or more of service models 130, maintenance window models 140, and maintenance window instances 150, and reusable service instances 180 via these communicative couplings. Service instance binder 120 operates to determine a maintenance efficient binding of a selection of reusable service instances with which to provide an instance of an IT service. By "binding," what is meant is an assembly of one or more reusable service instances into an information technology service in accordance with a service model 130 of the IT service. In one embodiment, the IT service that is assembled by the binding of service instance binder 120 is an IT service that has been requested, such as by a client (e.g., IT service request 105).

Service models 130 are a stored set of pre-existing templates of IT services instances, represented as model IT service instances and associations with other model IT service instances and maintenance model instances. Service models 130 are communicatively coupled with service instance binder 120 and can be provided to or accessed by service instance binder 120. In FIG. 1, two service models (130-1, 130-2) are illustrated in service models 130. It is appreciated that service models 130 can include a greater or lesser number of service models 130. In one embodiment, an information technology service request 105 is used as a pointer to a service model (e.g., in one embodiment, IT service request 105 points to service model 130-1) or as a search instrument for accessing an appropriate service model 130. A particular service model 130 (e.g., service model 130-1) comprises a description of a plurality of service instances which cumulatively represent a model of an IT service. It is appreciated that a particular service model, such as service model 130-1, describes an arrangement of service instances (which may be reusable service instances 180, new service instances, or some combination of reusable service instances 180 and new service instances) that can be used as a template for binding service instances into an information technology service to be provided by datacenter 170. In various embodiments, service models 130 exist as data structures stored in a random access memory, a data storage unit, or other memory, storage, or combination thereof on, or accessible by, a computer system.

Maintenance window models 140 are models or templates for maintenance actions of service models 130. As such, a particular maintenance window model 140 is associated with a particular service model 130 (e.g., 130-1). A maintenance window model 140 describes maintenance requirements (e.g., activities, actions, and sequencing thereof) associated with a particular IT service instance that is modeled by the service model 130 with which the maintenance window model 140 is associated. It is appreciated that a particular service model 130 may have a plurality of different maintenance window models 140 associated with it, each modeling actions and activities involved in a type of IT maintenance (e.g., a software upgrade, reboot, or the like) that can be performed on an IT service instance represented by the particular service model 130. While estimated elapsed times for accomplishing maintenance requirements may be included in the data of a maintenance window model 140, a maintenance window model 140 is not "time-bound." That is, a maintenance window model 140 is not associated with a specific time of day or window of time. Thus while a maintenance window model 140 may indicate that maintenance requirements for a maintenance activity associated with a service model 130 (e.g. service model 130-1) can notionally be accomplished in one hour, the maintenance window model 140 will not specify a particular time (e.g. Monday from 20:00 to 21:00 Greenwich Mean Time (GMT)) during which the maintenance will be scheduled to take place). Maintenance window models 140 are communicatively coupled with service instance binder 120 and can be provided to or accessed by service instance binder 120. In various embodiments, maintenance window models 140 exist as data structures stored in a random access memory, a data storage unit, or other memory, storage, or combination thereof on, or accessible by, a computer system.

Maintenance window instances 150 are actual maintenance windows (time spans) that are associated with particular service instances, such as reusable service instances 180 that are available for reuse in datacenter 170. Maintenance window instances 150 are communicatively coupled with service instance binder 120. Maintenance window instances are time-bound and are associated with a particular span, such as a span of time in a day. Thus, by way of example and not of limitation, a maintenance window instance 150 associated with reusable service instance 180-3 may specify that all maintenance to reusable service instance 180-3 is to take place daily between the times of 22:30 and 23:45 GMT. It is appreciated that a newly created service instance may or may not be created with an associated maintenance window instance 150. It is also appreciated that a reusable service instance 180 may have more than one maintenance window instance 150 associated with it or no maintenance window instance associated with it. In various embodiments, maintenance window instances 150 exist as data or data structures stored in a random access memory, a data storage unit, or other memory, storage, or combination thereof on, or accessible by, a computer system. In one embodiment, whenever a service instance, such as a new service instance or a reusable service instance 180 has an associated maintenance window instance 150, the maintenance window instance 150 is stored in data management system 110 and associated with the service instance.

Figure 2:
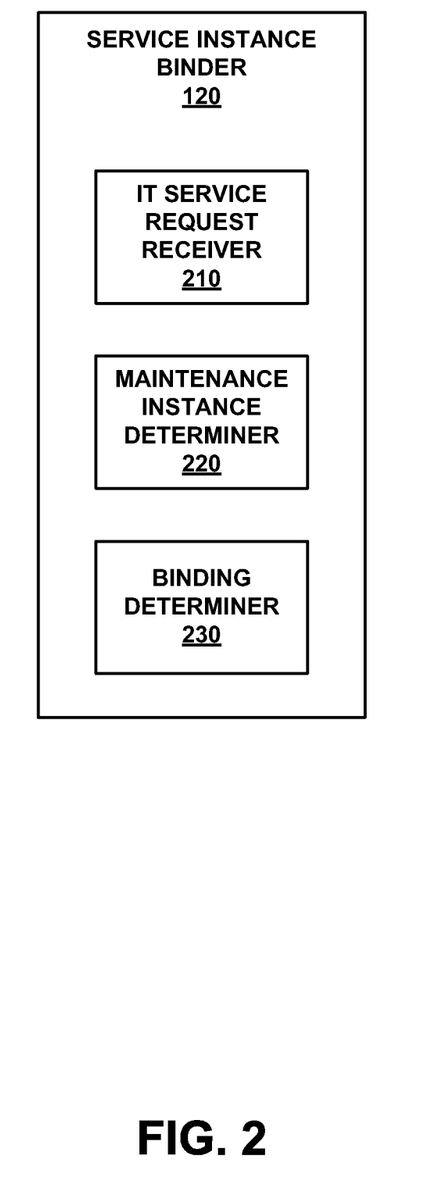
FIG. 2 is a block diagram of a service instance binder, in accordance with an embodiment.

FIG. 2 is a block diagram of service instance binder 120, in accordance with an embodiment. As depicted in FIG. 2, service instance binder 120 comprises an IT service request receiver 210, a maintenance instance determiner 220, and a binding determiner 230. It is appreciated that a greater or lesser number of components are possible in other embodiments, and the components and/or functions may be combined in various ways other than those depicted.

IT service request receiver 210 receives an IT service request 105. It is appreciated that IT service request 105 can be received from any of numerous entities, including entities that own or operate datacenter management system 110 and customers of datacenter management system 110. In one embodiment, IT service request receiver 210 receives an IT service request 105 from a customer and the received request constitutes a request for a remotely provided IT service. In one embodiment, such an IT service request 105 is received as a result of customer interaction with a web interface or other similar online catalog of IT services from which the customer can select and order IT service request 105. It is also appreciated that IT service request receiver 210 can receive such IT service requests 105 from owners/operators of datacenter management system 110 and/or datacenter 170, such as for the purposes of creating bindings of services that can then be utilized internally or offered to clients, such as in an online catalog of ready made IT services. In one embodiment, an IT service request 105 specifies a requested maintenance window in addition for the requested IT service (e.g., a maintenance window within the time span of 20:00 to 23:30 GMT each day). It is appreciated that, for example, a customer may make such a maintenance window request in order to have some control over the time period that the customers IT services will or may be unavailable due to maintenance.

Maintenance instance determiner 220 determines maintenance window instances that are associated with one or more service instances, such as reusable service instances 180 that are available for reuse in datacenter 170. Maintenance instance determiner 220 includes maintenance window determining logic, for performing such determination, which can be embodied in hardware, a combination of hardware and firmware, and/or a combination of hardware and software. The maintenance window determining logic allows maintenance instance determiner 220 to either access and ascertain a pre-established maintenance window instance 150 that is associated with a particular service instance (e.g., reusable service instance 180-2B), or to establish or bind a maintenance window instance to a particular service instance when none exists.

By "binding a maintenance window instance," what is meant is that a service instance with no pre-existing maintenance window is assigned a maintenance window. In this manner, in one embodiment, a service instance with no pre-existing maintenance window is assigned to have the same maintenance window as the pre-existing maintenance window of another service instance that it becomes bound with when assembled into an IT service by binding determiner 230. In another embodiment, a service instance with no pre-existing maintenance window is assigned to have the same maintenance window that is defined or specified in conjunction with IT service request 105.

Additionally, maintenance instance determiner 220 analyzes the feasibility of a maintenance window instance (i.e., whether it is sufficient in time length for the type of IT maintenance that will or may need to be performed) based upon analyzing the maintenance requirements outlined in a maintenance window model that is associated with an IT service instance that is being assembled. Maintenance instance determiner 220 analyzes the modeled maintenance requirements in conjunction with the scheduled maintenance window(s) that is/are defined by the maintenance window instances 150 of a service instance, such as a reusable service instance 180, in order to determine if it is feasible or possible that the required IT maintenance for the IT service (e.g. IT service request 105) can be performed in the maintenance window instance 150 of the service instance that will be/may become a component that is assembled into a particular IT service.

Binding determiner 230 analyzes maintenance window instances 150 that are associated with service instances (e.g., reusable service instances 180) in conjunction with a service model 130 that service instance binder 120 is using as a model for a requested IT service 105. This analysis is in addition to analyzing for compatibility in type and variation. Through such analysis, binding determiner 230 reasons through one or more possibilities (e.g., in one embodiment, a variety of arrangements of service instances which satisfy requirements of a service model 130) and from them determines a maintenance efficient binding of services instances (e.g., reusable service instances 180, new service instances, or some combination thereof). Binding determiner 230 includes binding determining logic, for performing such analyses, which can be embodied in hardware, a combination of hardware and firmware, and/or a combination of hardware and software.

The binding determining logic allows binding determiner 230 to create and evaluate a variety of possible service instances and/or bindings of service instances which satisfy criteria of a service model 130 and an IT service request 105. By "bindings of service instances," what is meant is that a collection of IT services are bound or linked with one another, in accordance with the template provided by a service model 130, such that together the services instances constitute an IT service (e.g., requested IT service 105). In one embodiment, this bound collection of service instances that forms the IT service can then be considered a maintainable service instance 155, which can be instantiated by grounding it within datacenter 170. In one embodiment, a maintainable service instance 155 can be provided to an entity such as a requester of IT service request 105 as an offering that can be instantiated in response to IT service request 105.

By "maintenance efficient," what is meant is that binding determiner 230 evaluates options to bind together a maintainable service instance 155 that uses reusable service instances 180 (where possible) to create the smallest possible maintenance window for a requested IT service instance 105 that has no specified maintenance window associated with it; or, in the event that a particular maintenance window is associated with a requested IT service 105, binding determiner 230 evaluates options to bind together a maintainable service instance 155 that uses reusable service instances 180 (where possible) to create the smallest possible maintenance window for a requested IT service instance 105 that satisfies (i.e., fits inside) or comes closest to satisfying the specified maintenance window.

Figure 3:
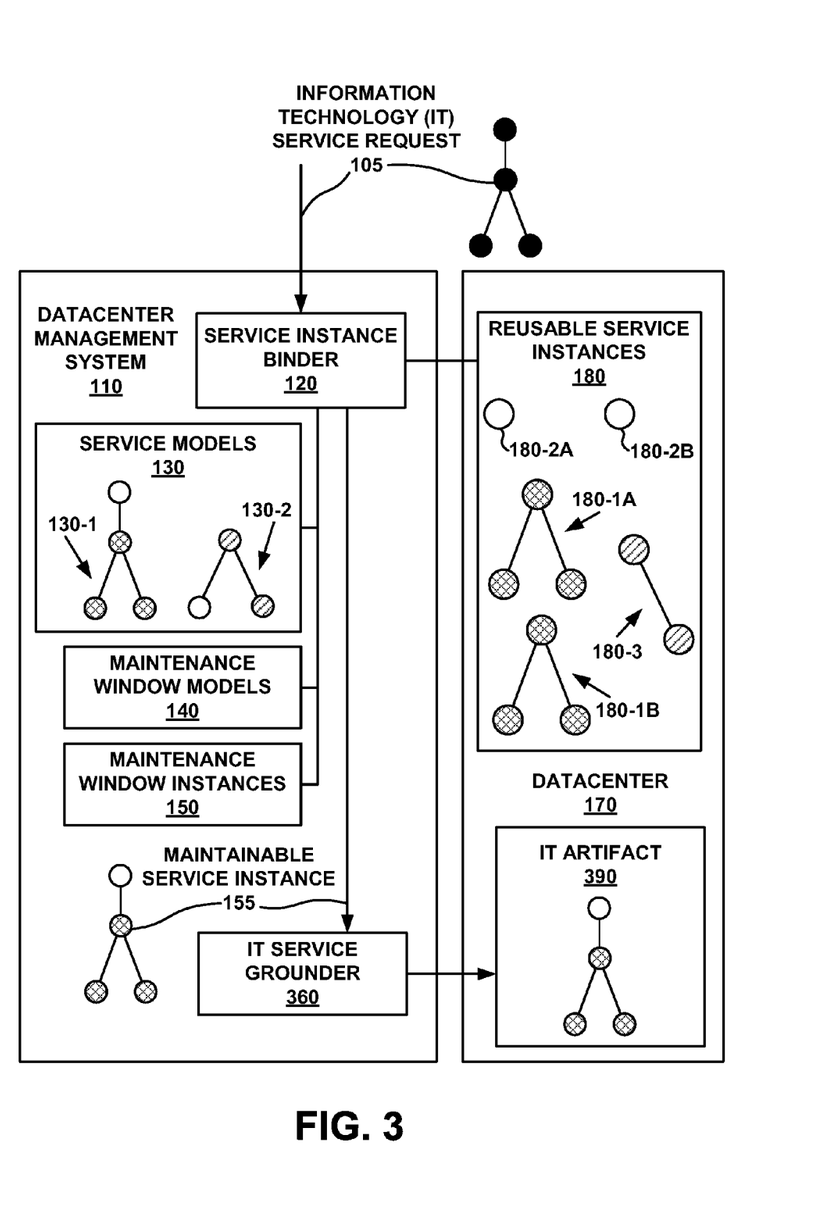
FIG. 3 is a second example block diagram showing a datacenter management system and a datacenter, in accordance with an embodiment.

FIG. 3 is second example block diagram showing datacenter management system 110 and datacenter 170, in accordance with an embodiment. In FIG. 3, an IT service grounder 360 is additionally included in datacenter management system 110. IT service grounder 360 operates to ground a maintenance efficient binding (e.g., maintainable service instance 155) in datacenter 170. What is meant by "grounding," is that the servers, hardware, and software that the comprise service instances, and that together form maintainable service instance 155, are dedicated and/or "built-out" within datacenter 170 to create an IT artifact 390. After grounding, IT artifact 390 then exists and operates within datacenter 170 as an IT service that fulfills IT service request 150.

Example Methods of Operation

Figure 4:
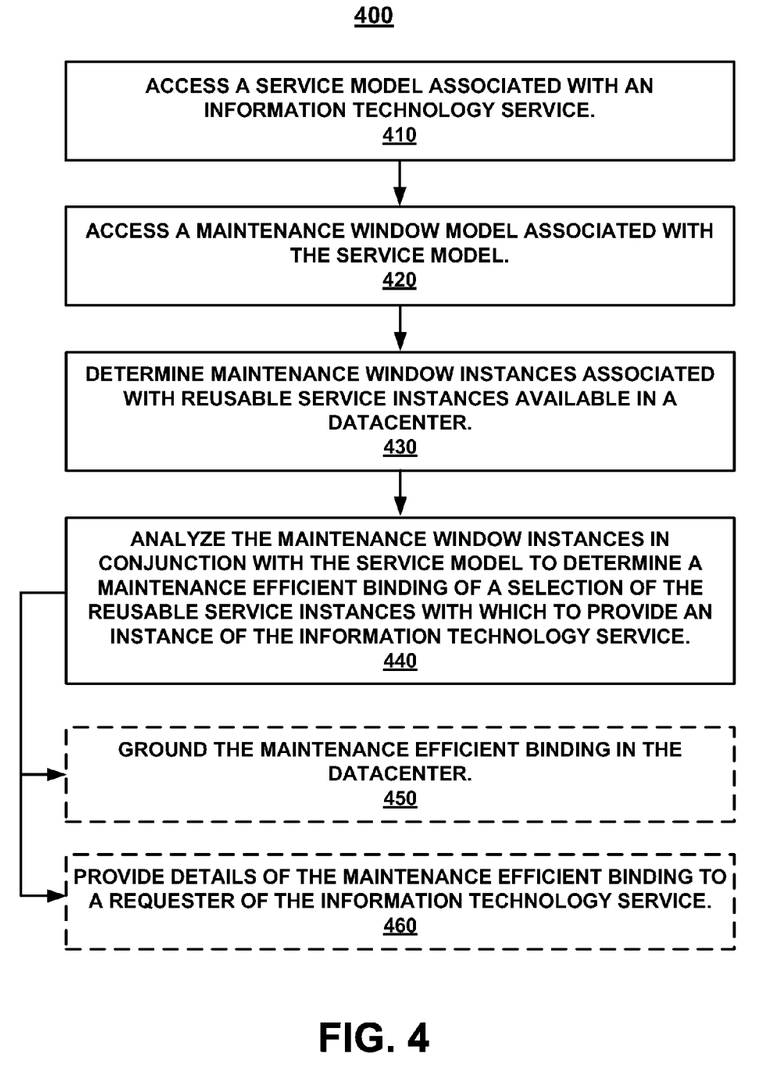
FIG. 4 is a flow diagram of a method of instantiating an information technology (IT) service in light of maintenance requirements, according to one embodiment.
Figure 5:
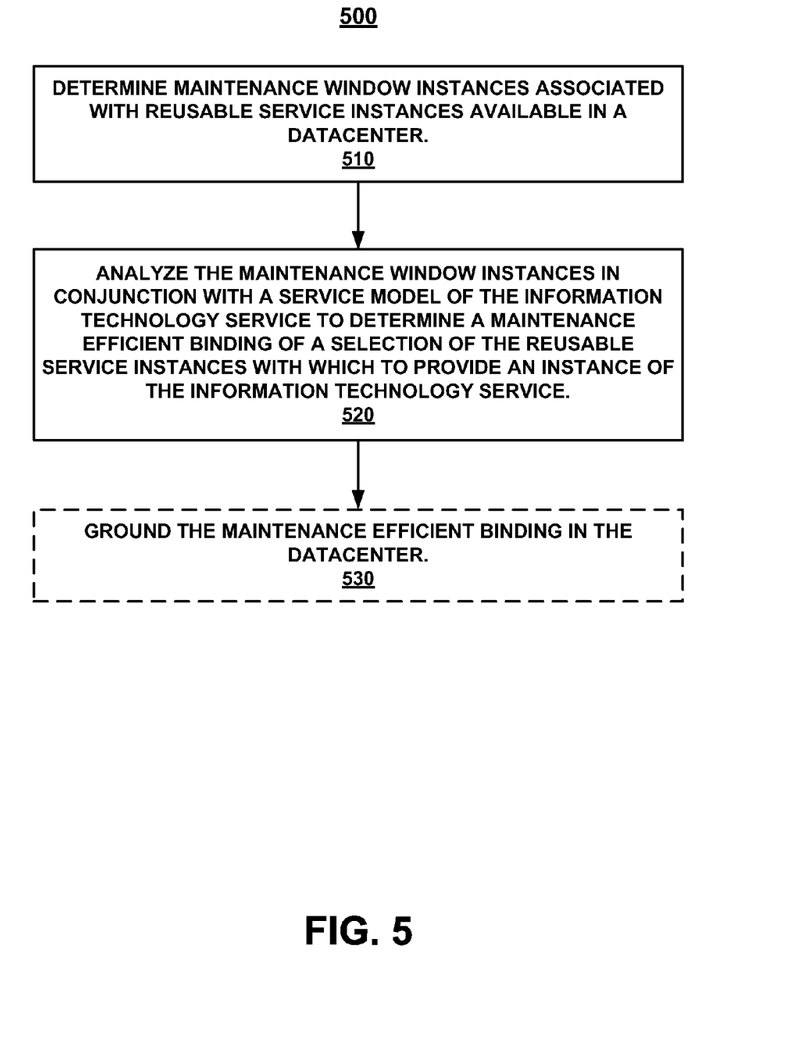
FIG. 5 is a second flow diagram of a method of instantiating an IT service in light of maintenance requirements, according to one embodiment.

The following discussion sets forth in detail the operation of some example methods of operation of embodiments. With reference to FIG. 4 and FIG. 5, flow diagrams 400 and 500 illustrate example procedures used by various embodiments. Flow diagrams 400 and 500 include some procedures that, in various embodiments, are carried out by a processor under the control of computer-readable and computer-executable instructions. In this fashion, one or both of flow diagrams 400 and 500 are implemented using a computer, in various embodiments. The computer-readable and computer-executable instructions can reside in any tangible computer readable storage media, such as, for example, in data storage features such as computer usable volatile memory 608, computer usable non-volatile memory 610, peripheral computer-readable storage media 602, and/or data storage unit 612 (all of FIG. 6). The computer-readable and computer-executable instructions, which reside on tangible computer readable storage media, are used to control or operate in conjunction with, for example, one or some combination of processors 606A, 606B, and 606C of FIG. 6, or other similar processor(s). Although specific procedures are disclosed in flow diagrams 400 and 500, such procedures are examples. That is, embodiments are well suited to performing various other procedures or variations of the procedures recited in flow diagrams 400 and 500. Likewise, in some embodiments, the procedures in flow diagrams 400 and 500 may be performed in an order different than presented and/or not all of the procedures described in one or both of these flow diagrams may be performed.

Example Method of Instantiating an Information Technology Service in Light of Maintenance Requirements FIG. 4 illustrates a flow diagram 400 of an example embodiment of a method of instantiating an information technology (IT) service in light of maintenance requirements. Elements of flow diagram 400 are described below, with reference to elements of FIGS. 1-3.

For purpose of describing some non-limiting examples of the methods of flow diagrams 400 and 500, the following assumptions can be made: reusable service instance 180-1A is shown as hatched and represents a database instance comprising an operating system and database running on a server blade; reusable service instance 180-1B is shown as hatched and represents another database instance comprising an operating system and database running on a server blade; reusable service instance 180-2A is shown as unhatched and represents a web server instance comprising an operating system running on a server blade; reusable service instance 180-2B is shown as unhatched and represents another web server instance comprising an operating system running on a server blade; and reusable service instance 180-3 is shown as crosshatched and represents a weblog comprising blogging software and an operating system running on a server blade. Service model 130-1 comprises a model of an IP tracking system that is assembled from an instance of a database and an instance of a web server; and service model 130-2 comprises a model of a hosted website that is assembled from an instance of weblog and an instance of a web server. These assumptions and this specific example are provided by way of example only, and not of limitation. It is appreciated that this example is only one of numerous possibilities for the use/operation of datacenter management system 110 in conduction with datacenter 170.

At 410 of flow diagram 400, in one embodiment, the method accesses a service model associated with an IT service. The service model comprises a description of a plurality of service instances which cumulatively represent a model of the IT service. In one embodiment, this comprises service instance binder 120 receiving an IT service request 105 and accessing a service model 130 that matches the requested IT service. Consider an embodiment, where requested IT service 105 is a request for a high speed Linux IP tracking system. In such an embodiment, service instance binder 120 accesses service model 130-1, because service model 130-1 is a model for assembling an IP tracking system from service instances.

At 420 of flow diagram 400, in one embodiment, the method accesses a maintenance window model associated with the service model. The maintenance window model is descriptive of maintenance requirements associated with the service instances. In one embodiment, service instance binder 120 accesses one or more maintenance window models 140 that are associated with a selected service model, such as service model 130-1.

At 430 of flow diagram 400, in one embodiment, the method determines maintenance window instances associated with reusable service instances available in a datacenter. In one embodiment, this comprises service instance binder 120 accessing maintenance window instances 150 that are associated with reusable service instances 180 of datacenter 170. Following the example, it is appreciated, that in one embodiment, this comprises determining only maintenance window instances for reusable service instances that can be used in construction of an IT service modeled by service model 130-1. In one embodiment, maintenance window instances are determined by maintenance instance determiner 220, based upon analysis of the maintenance requirements detailed in maintenance window model 140 being analyzed in conjunction with scheduled maintenance windows of said reusable service instances. This can determine if, for instance, a maintenance window is sufficient for the type/length of maintenance which may need to be performed.

In order to determine maintenance windows, some starting basis must exist, this if there is no pre-defined defined window for a service instance, in one embodiment, one is defined by maintenance instance determiner 220. In one embodiment, this comprises maintenance instance determiner 220 defining a service instance with no preset maintenance window to bind to (take on) a maintenance window associated with an IT service that is being created, such a maintenance window that was defined by a client in conjunction with IT service request 105.

In other embodiments, as briefly described above, the determining of a maintenance window can include maintenance instance determiner 220, defining that a subordinate service instance with no preset maintenance window is to bind to (take on) an existing maintenance window of a superior service instance with respect to a hierarchy of the service model or defining that a superior service instance with no preset maintenance window is to bind to (take on) an existing maintenance window of a subordinate service instance with respect to a hierarchy of said service model. Thus, with reference to service model 130-1 reusable services instances 180-1A and 180-2A, would be subordinate either reusable service instances 180-2A or 180-2B with respect to a top-town tree hierarchy where lower vertical positions are subordinate to higher vertical positions. In a situation where reusable service instance 180-2A had no predefined maintenance window, it could be bound to the maintenance window of reusable service instance 180-1A or 180-1B in accordance with assembly of an IT service based on service model 130-1. Likewise, in a situation where reusable service instance 180-1A had no predefined maintenance window, it could be bound to the maintenance window of reusable service instances 180-2A or 180-2B in accordance with assembly of an IT service based on service model 130-1.

At 440 of flow diagram 400, in one embodiment, the method analyzes the maintenance window instances in conjunction with the service model to determine a maintenance efficient binding of a selection of the reusable service instances with which to provide an instance of the IT service. In one embodiment, this comprises binding determiner 230 determining this maintenance efficient binding. This includes taking into account type and variation of service instances. If, as in the example, IT service request 105 specifies a Linux (type) high speed (variation) IP tracking system, binding determiner will only select reusable service instances 180 that satisfy these type and variation requirements (e.g., no low speed service instances or non-Linux service instances) in addition to discriminating based upon an analysis of maintenance window instances. In an event that a reusable service instance of compatible type and variation is not available for reuse in datacenter 170, binding determiner 230 determines that a new service instance should be created in datacenter 170 and included in the maintenance efficient binding. Likewise, in an event that a reusable service instance with a compatible maintenance window to the requested IT service 105 is not available for reuse in datacenter 170, binding determiner 230 determines that a new service instance should be created in datacenter 170 and included in the maintenance efficient binding. The maintenance window for such newly created service instances can be set as required to ensure a maintenance efficient binding.

For purposes of example, and not of limitation, consider an embodiment where reusable service instance 180-1A has a maintenance window instance of 01:30 GMT to 02:00 GMT; reusable service instance 180-1B has a maintenance window instance of 21:00 GMT to 22:00 GMT; reusable service instance 180-2A has a maintenance window instance of 01:00 GMT to 01:30 GMT; and reusable service instance 180-2B has a maintenance window instance of 20:00 GMT to 23:00 GMT.

In one embodiment, binding determiner 230 analyzes one or more maintenance windows associated with available reusable service instances 180 to determine if the maintenance windows of the reusable service instances fit within a maintenance window defined in conjunction with an IT service (e.g. IT service request 105). Thus, if a maintenance window of 20:00 to 23:30 GMT is specified as part of IT service request 105, binding determiner 230 analyzes maintenance window instances 150 that are associated with reusable service instances 180-1A, 180-1B, 180-2A, and 180-2B to determine if their existing maintenance window instances fit within this defined maintenance window. In accordance with the example, in one embodiment, the analysis performed by binding determiner 230 determines that reusable service instances 180-1B and 180-2B can be assembled in accordance with service model 130-1 to create a maintenance efficient IT service that fits within the defined maintenance window of 20:00 to 23:30 GMT that is associated with IT service request 105. It is possible that a plurality of such maintenance efficient solutions exist. In such a situation, in one embodiment, binding determiner selects a combination that satisfies criteria of service model 130-1, maintenance window models 140, and provides a smallest possible maintenance window that fits within the specified maintenance window that is associated with requested IT service 105. The maintenance efficient binding is represented as maintainable service instance 155.

In another embodiment, such as where a maintenance window is not specified with IT service request 105, binding determiner 230 analyzes one or more maintenance window instances 150 associated with available reusable service instances 180 to determine a selection of the reusable services 180 which satisfies criteria of service model 130-1, maintenance window models 140, and provides a smallest possible maintenance window. In accordance with the example, in one embodiment, binding determiner 230 analyzes maintenance window instances 150 that are associated with reusable service instances 180-1A, 180-1B, 180-2A, and 180-2B to determine which combination in accordance with service model 130-1 yields the smallest overall maintenance window for an assembled IT service. In accordance with the example maintenance window instances provide above, in one embodiment, the analysis performed by binding determiner 230 determines that reusable service instances 180-1A and 180-2A can be assembled in accordance with service model 130-1 to create a maintenance efficient IT service that yields an overall maintenance window of 01:00 GMT to 02:00 GMT. Binding determiner selects these reusable service instances (180-1A and 180-1A) because their cumulative one hour long maintenance window is the shortest maintenance window that can be created for an IT service based on service model 130-1 and using reusable service instances 180. This maintenance efficient binding is represented as maintainable service instance 155.

At 450 of flow diagram 400, in one embodiment, the method grounds the maintenance efficient binding in the datacenter. With reference to FIG. 3, in one embodiment, this comprises IT service grounder 360 grounding maintainable service instance 155 in datacenter 170 as IT artifact 390.

At 460 of flow diagram 400, in one embodiment, the method provides details of the maintenance efficient binding to a requester of the IT service. In one embodiment, this comprises datacenter management system 110 (or some portion thereof) providing access to or outputting maintainable service instance 155, such that a requester of IT service instance 105 can receive information about an IT service that can be provided in response to the request.

Example Method of Instantiating an Information Technology Service in Light of Maintenance Requirements FIG. 5 illustrates a flow diagram 500 of an example embodiment of a method of instantiating an information technology (IT) service in light of maintenance requirements. Elements of flow diagram 500 are described below, with reference to elements of FIGS. 1-4 and with reference to processes and examples previously described in conjunction with the method illustrated by flow diagram 400.

At 510 of flow diagram 500, in one embodiment, the method determines maintenance window instances associated with reusable service instances available in a datacenter. In one embodiment, maintenance instance determiner 220 determines these maintenance window instances. For example, in the manner previously described with 430 of flow diagram 400, in one embodiment, maintenance instance determiner 220 determines the maintenance window instances based upon a maintenance window model (e.g., a maintenance window model 140 that is associated with service model 130-1) analyzed in conjunction with scheduled maintenance window instances 150 of a reusable service instance 180 or combination of a plurality of reusable service instances 180 that can be employed to build an IT service instance that complies with a particular service model 130 (e.g., service model 130-1).

At 520 of flow diagram 500, in one embodiment, the method analyzes the maintenance window instances in conjunction with a service model of the IT service to determine a maintenance efficient binding of a selection of the reusable service instances with which to provide an instance of the IT service. In one embodiment, binding determiner 230 performs this analysis. Consider an embodiment that follows the example illustrated in conjunction with description of flow diagram 400. In such an embodiment, binding determiner 230 analyzes combinations of reusable service instances 180-1A, 180-1B, 180-2A, and 180-2B in conjunction with service model 130-1 (which is a service model of an IP tracker that was requested in IT service request 105) to determine a maintenance efficient binding (e.g., maintainable service instance 155) of a selection of these reusable service instances with which to provide an instance of requested IT service 105. This analysis is performed in a manner consistent with the description provided in conjunction with 440 of flow diagram 400. Thus, in one embodiment, binding determiner 230 performs the analysis to determine a selection of the reusable service instances 180 which satisfies criteria of service model 130-1 and provides a smallest possible maintenance window. When no maintenance window is specified in association with requested IT service 105, this comprises a smallest overall maintenance window. When a maintenance window is specified in association with requested IT service 105, this comprises a maintenance window that fits within the specified maintenance window associated with the requested IT service 105 or if numerous solutions exist that fit with the specified maintenance window a solution with a smallest maintenance window is determined.

At 530 of flow diagram 500, in one embodiment, the method grounds the maintenance efficient binding in the datacenter. With reference to FIG. 3, in one embodiment, this comprises IT service grounder 360 grounding maintainable service instance 155 in datacenter 170 as IT artifact 390. It is appreciated that maintainable service instance 155 can additionally or alternatively be provided to a requester of IT service request 150.

Example Computer System Environment

Figure 6:
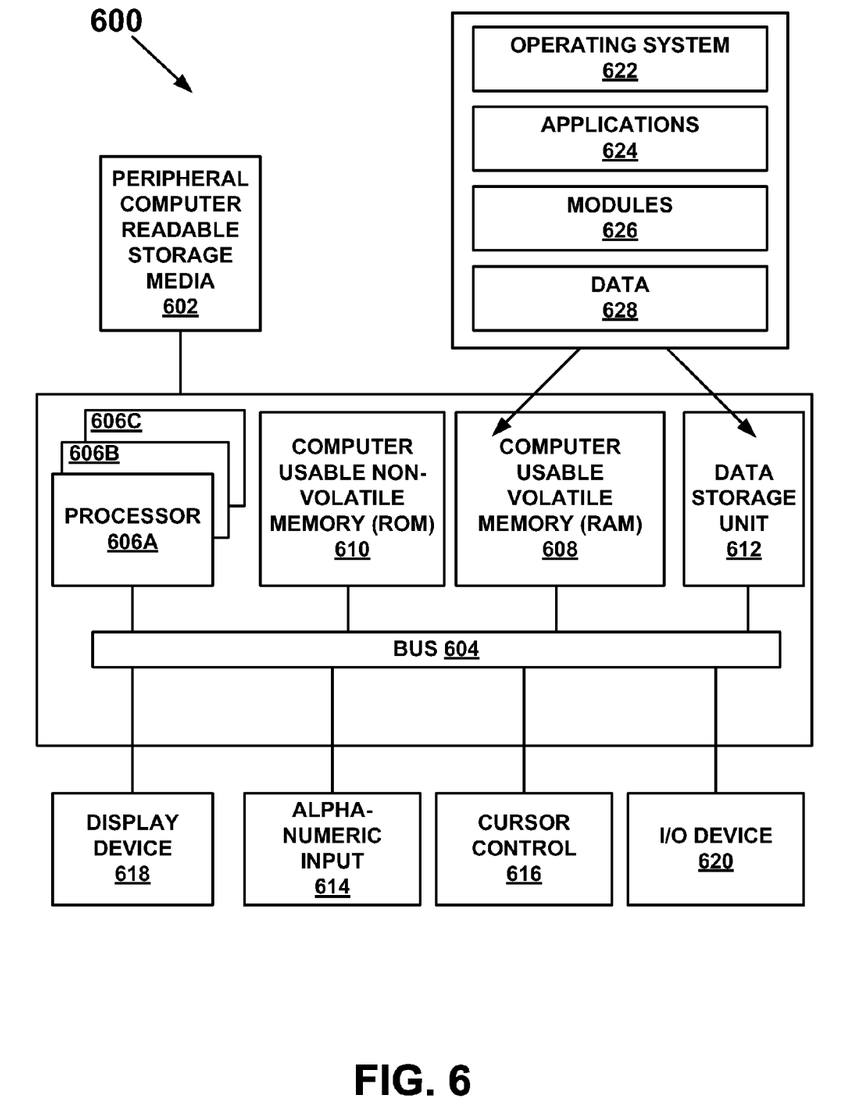
FIG. 6 is a block diagram of an example computer system, according to an embodiment, with which or upon which embodiments of the present invention can be implemented.

With reference now to FIG. 6, all or portions of some embodiments described herein are composed of computer-readable and computer-executable instructions that reside, for example, in computer-usable/computer-readable storage media of a computer system. That is, FIG. 6 illustrates one example of a type of computer (computer system 600) that can be used in accordance with or to implement various embodiments which are discussed herein. It is appreciated that computer system 600 of FIG. 6 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, server blades, and the like. Computer system 600 of FIG. 6 is well adapted to having peripheral computer-readable storage media 602 such as, for example, a floppy disk, a compact disc, a digital versatile disc (DVD), a USB (universal serial bus) flash memory drive and the like coupled thereto.

System 600 of FIG. 6 includes an address/data bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g. random access memory (RAM), coupled to bus 604 for storing information and instructions for processors 606A, 606B, and 606C. System 600 also includes computer usable non-volatile memory 610, e.g. read only memory (ROM), coupled to bus 604 for storing static information and instructions for processors 606A, 606B, and 606C. Also present in system 600 is a data storage unit 612 (e.g., a magnetic or optical disk and disk drive) coupled to bus 604 for storing information and instructions.

In some embodiments, system 600 also optionally includes other components. For example, system 600 also includes an optional alphanumeric input device 614 including alphanumeric and function keys coupled to bus 604 for communicating information and command selections to processor 606A or processors 606A, 606B, and 606C. System 600 also includes an optional cursor control device 616 coupled to bus 604 for communicating user input information and command selections to processor 606A or processors 606A, 606B, and 606C. In one embodiment, system 600 also includes an optional display device 618 coupled to bus 604 for displaying information.

Referring still to FIG. 6, optional display device 618 of FIG. 6 may be a liquid crystal device, cathode ray tube, plasma display device or other display device suitable for creating graphic images and alphanumeric characters recognizable to a user. Optional cursor control device 616 allows the computer user to dynamically signal the movement of a visible symbol (cursor) on a display screen of display device 618 and indicate user selections of selectable items displayed on display device 618. Many implementations of cursor control device 616 are known in the art including a trackball, mouse, touch pad, joystick or special keys on alpha-numeric input device 614 capable of signaling movement of a given direction or manner of displacement. Alternatively, it will be appreciated that a cursor can be directed and/or activated via input from alpha-numeric input device 614 using special keys and key sequence commands. System 600 is also well suited to having a cursor directed by other means such as, for example, voice commands. System 600 also includes an I/O device 620 for coupling system 600 with external entities. For example, in one embodiment, I/O device 620 is a modem for enabling wired or wireless communications between system 600 and an external network such as, but not limited to, the Internet.

Referring still to FIG. 6, various other components are depicted for system 600. Specifically, when present, an operating system 622, applications 624, modules 626, and data 628 are shown as typically residing in one or some combination of computer usable volatile memory 608 (e.g., RAM), computer usable non-volatile memory 610 (e.g., ROM), and data storage unit 612. In some embodiments, all or portions of various embodiments described herein are stored, for example, as an application 624 and/or module 626 in memory locations within RAM 608, computer-readable storage media within data storage unit 612, peripheral computer-readable storage media 602, and/or other tangible computer readable storage media.

Example embodiments of the subject matter are thus described. Although various embodiments of the subject matter have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A computer-readable storage medium having instructions stored thereon which, when executed, cause a computer processor to perform a method of instantiating an information technology (IT) service in light of maintenance requirements, said method comprising instructions for:
    determining maintenance window instances associated with reusable service instances available in a datacenter; and
    analyzing said maintenance window instances in conjunction with a service model of said IT service to determine a maintenance efficient binding of a selection of said reusable service instances with which to provide an instance of said IT service.

2. The computer-readable storage medium of claim 1, further comprising instructions for:
    grounding said maintenance efficient binding in said datacenter.

3. The computer-readable storage medium of claim 1, wherein said determining maintenance window instances associated with reusable service instances available in a datacenter comprises:
    determining said maintenance window instances based upon a maintenance window model in analyzed in conjunction with scheduled maintenance windows of said reusable service instances.

4. The computer-readable storage medium of claim 1, wherein said analyzing said maintenance window instances in conjunction with a service model of said IT service to determine a maintenance efficient binding of a selection of said reusable service instances with which to provide an instance of said IT service comprises:
    performing said analyzing to determine said selection of said reusable service instances which satisfies criteria of said service model and provides a smallest possible maintenance window.

5. A computer-implemented method of instantiating an information technology (IT) service in light of maintenance requirements, said method comprising:
    accessing a service model associated with an IT service, said service model comprising a description of a plurality of service instances which cumulatively represent a model of said IT service;
    accessing a maintenance window model associated with said service model, said maintenance window model descriptive of maintenance requirements associated with said service instances;
    determining maintenance window instances associated with reusable service instances available in a datacenter; and
    analyzing said maintenance window instances in conjunction with said service model to determine a maintenance efficient binding of a selection of said reusable service instances with which to provide an instance of said IT service.

6. The computer-implemented method as recited in claim 5, further comprising:
    grounding said maintenance efficient binding in said datacenter.

7. The computer-implemented method as recited in claim 5, wherein said determining maintenance window instances associated with reusable service instances available in a datacenter comprises:

determining said maintenance window instances based upon said maintenance window model in conjunction with scheduled maintenance windows of said reusable service instances.

8. The computer-implemented method as recited in claim 5, wherein said analyzing said maintenance window instances in conjunction with said service model to determine a maintenance efficient binding of a selection of said reusable service instances with which to provide an instance of said IT service further comprises:
- in an event that a reusable service instance of compatible type and variation is not available for reuse in said datacenter, determining that a new service instance should be created in said datacenter and included in said maintenance efficient binding.

9. The computer-implemented method as recited in claim 5, wherein said analyzing said maintenance window instances in conjunction with said service model to determine a maintenance efficient binding of a selection of said reusable service instances with which to provide an instance of said IT service further comprises:
- in an event that a reusable service instance with a compatible maintenance window to said IT service is not available for reuse in said datacenter, determining that a new service instance should be created in said datacenter and included in said maintenance efficient binding.

10. The computer-implemented method as recited in claim 5, wherein said analyzing said maintenance window instances in conjunction with said service model to determine a maintenance efficient binding of a selection of said reusable service instances with which to provide an instance of said IT service comprises:
- analyzing a maintenance window associated with a reusable service instance of said reusable service instances to determine if said maintenance window fits within a maintenance window defined in conjunction with said IT service.

11. The computer-implemented method as recited in claim 5, wherein said analyzing said maintenance window instances in conjunction with said service model to determine a maintenance efficient binding of a selection of said reusable service instances with which to provide an instance of said IT service comprises:
- performing said analyzing to determine said selection of said reusable services which satisfies criteria of said service model and provides a smallest possible maintenance window.

12. A datacenter management system, said system comprising:
- a service instance binder configured to determine a maintenance efficient binding of a selection of reusable service instances with which to provide an instance of an IT service, said reusable service instances available in a datacenter;
- a service model communicatively coupled with said service instance binder, said service model comprising a description of a plurality of service instances which cumulatively represent a model of said IT service;
- a maintenance window model associated with said service model and communicatively coupled with said service instance binder, said maintenance window model descriptive of maintenance requirements associated with said service instances; and
- a plurality of maintenance window instances communicatively coupled with said service instance binder and associated said with said reusable service instances.

13. The system of claim 12, further comprising:
- an IT service grounder configured for grounding said maintenance efficient binding in said datacenter.

14. The system of claim 12, wherein said service instance binder comprises:
- a binding determiner configured with logic for analyzing said maintenance window instances in conjunction with said service model to determine said maintenance efficient binding.

15. The system of claim 12, wherein said service instance binder comprises:
- a maintenance instance determiner configured with logic for determining maintenance window instances associated with reusable service instance available in said datacenter.

* * * * *